United States Patent Office 3,244,495
Patented Apr. 5, 1966

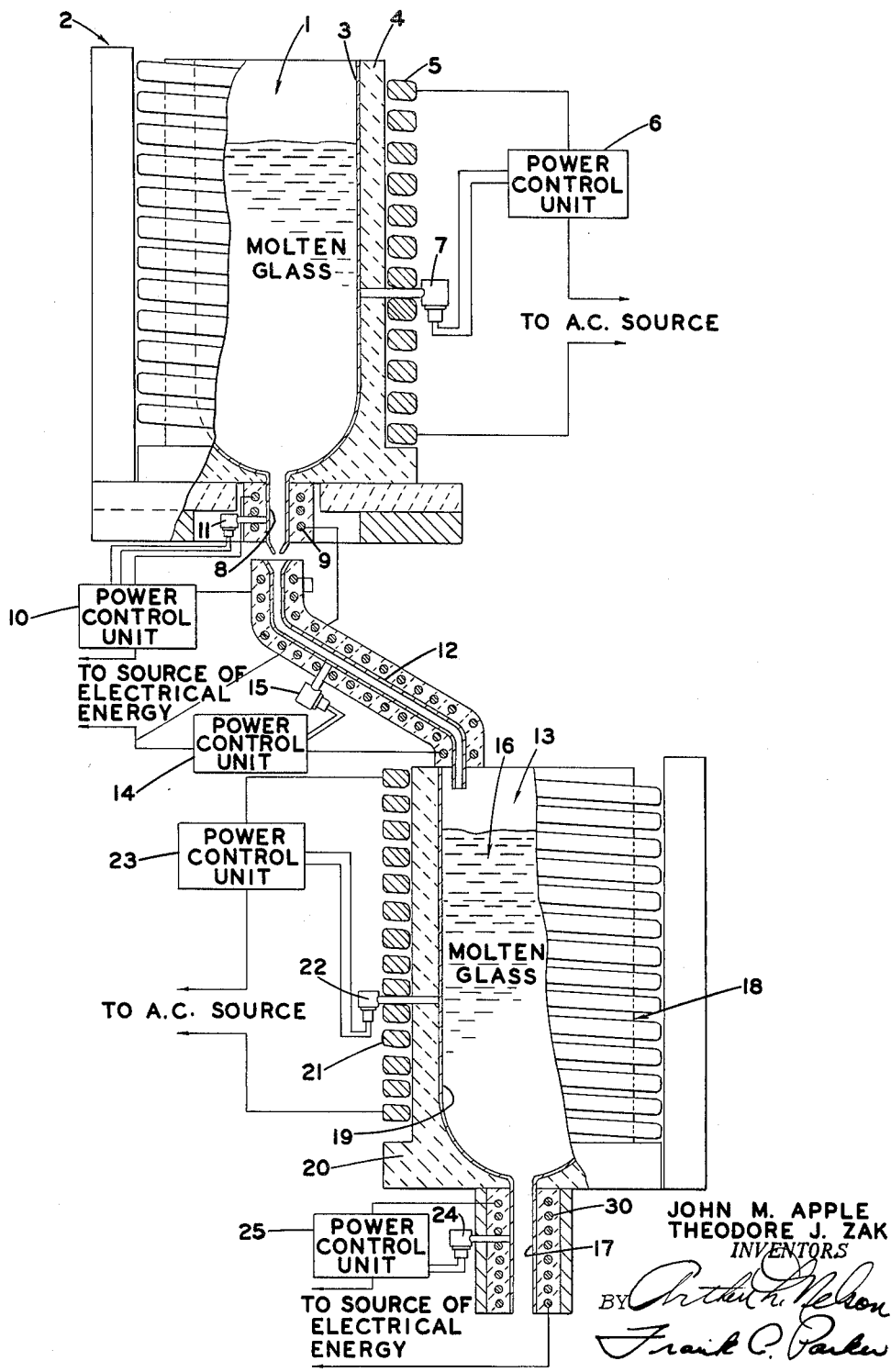

3,244,495
REGULATED FLOW GLASS MELTING FURNACE
John M. Apple, Henrietta, and Theodore J. Zak, Irondequoit, N.Y., assignors to Bausch & Lomb Incorporated, Rochester, N.Y., a corporation of New York
Filed July 2, 1962, Ser. No. 206,790
5 Claims. (Cl. 65—161)

This invention relates to a glass furnace and more particularly to the arrangement for isolation of the melting chamber relative to the conditioning chamber to control the rate of glass flow.

The continuous flow glass furnace necessitates a need for a control of the glass flow in the molten state through the furnace. To provide this desired constant rate of flow the viscosity of the molten glass and the hydraulic pressure at a point of the discharge orifice must be regulated to control the rate of discharge from the orifice. The viscosity is controlled directly by the temperature of the body of molten glass and the hydrostatic pressure is determined by the actual head of the body of molten glass. The viscosity and the hydrostatic pressure together with the area of the discharge orifice control the rate of flow of molten glass of any glass of a given density. Accordingly this invention is intended to provide an accurate constant rate of glass flow by regulating the variables affecting the rate of flow of the molten glass.

It is an object of this invention to thermally and hydraulically isolate the melting chamber and the conditioning chamber in a glass furnace to provide an accurate flow control means.

It is another object of this invention to provide a separate thermal system and pressure system for the melting pot and a second separate thermal system and pressure system for the conditioning pot to accurately regulate the rate of flow of discharge from the conditioning pot.

It is a further object of this invention to provide a thermally regulated melting pot having a predetermined pressure on the discharge orifice forming a first pressure system and means for transferring molten glass to an isolated conditioning chamber which is thermally controlled and has a predetermined pressure system for regulating the rate of flow from the orifice of the conditioning pot.

The objects of this invention are accomplished by providing a melting pot adapted for operation with a metered feed arrangement for charging a melting pot with glass forming material of the desired composition for glass. The melting pot has an automatic control for maintaining a predetermined temperature within the melting pot. A predetermined static head is maintained in accordance with the rate of feed and discharge to and from the melting pot. Discharge is further regulated by a thermal controller orifice heater.

A conditioning pot is positioned for receiving molten glass from the melting pot. A transfer means is provided between the melting pot and the conditioning pot to cool the melted glass to a conditioning temperature. The melting pot and the conditioning pot are completely isolated from each other and operate independently in response to automatic controls. The conditioning pot has automatic heat regulating means and receives molten glass from the melting pot at a predetermined rate to maintain a predetermined head for providing a constant hydrostatic pressure at the discharge orifice of the conditioning pot. An additional thermally controlled heating element is also associated with the discharge orifice of the conditioning pot to maintain uniform flow of molten glass from the conditioning chamber.

The scope of the invention and objects and advantages thereof will become apparent to those skilled in the art from the following detailed description taken in conjunction with the annexed drawings from which the preferred embodiment is disclosed.

The drawings illustrate schematically the melting chamber and conditioning chamber with means for controlling the rate of flow intermediate the chambers and from the discharge orifice of a conditioning chamber.

The flow control arrangement illustrated in the drawing provides for high operating temperature in the melting chamber to rapidly melt the glass charged in the melting chamber. Due to the high temperature the molten glass is not viscous but has liquid characteristics. Controlling the rate of flow from a melting chamber requires an orifice of a small cross sectional area to accurately meter the flow of glass from the melting chamber. The orifice in the melting chamber generally controls the hydrostatic head in the conditioning chamber. A conduit means directs the flow from the melting chamber to the conditioning chamber but is hydraulically isolated in other respects. Thermal and hydraulic isolation of the conditioning chamber permits the cooling of the melting glass as it is transferred from the melting chamber to the conditioning chamber. This eliminates the mixture of any hot or cold glass and permits ideal conditions of melting in the melting chamber and conditioning in the conditioning chamber. The temperature of the melted glass in the conditioning chamber is substantially lower than in the melting chamber. Consequently the glass is more viscous and the discharge from the conditioning chamber requires a larger orifice. The hydrostatic head and viscosity are accurately controlled through a temperature control system which in turn controls a rate of flow through the orifice which is critical in the production of ophthalmic lenses where the flowing stream of molten glass is sheared and the gob is deposited in the lens mold in an accurately timed cycle.

Referring to the drawings the melting chamber 1 is defined by the pot structure 2. A metallic liner 3 is received within the refractory material 4 and concentrically located within the induction coil 5. The induction coil 5 is electrcally connected to an alternating current source through the power control unit 6. The power control unit 6 is automatically controlled through the heat sensing unit 7 which is disposed on the side of the pot structure 2. An even temperature is maintained in the melting chamber.

The orifice 8 at the lower end of the melting chamber 1 is surrounded by a heating element 9 connected to the power control unit 10 and automatically controlled in response to the heat sensing unit 11. The flow through the orifice 8 is controlled by the pressure head and the density of the molten glass contained in the melting chamber 1 creating a pressure of the orifice 8. The power control unit 10 automatically controls the temperature of the orifice 8 and likewise maintains uniform flow of glass through the orifice 8.

The conduit 12 is positioned with its upper opening immediately below the orifice 8 and receives molten glass from the orifice. The glass flows through the conduit 12 and is permitted to flow into the conditioning chamber 13. The conduit 12 is heated and temperature controlled in response to the control unit 14 which operates in response to the heat sensing element 15. The temperature of the molten glass leaving the conduit 12 is substantially equal to the temperature of the body of molten glass 16 in the conditioning chamber 17. The rate of flow through the conduit 12 from the discharge orifice 8 relative to the rate of flow through the orifice 17 determines the head or hydrostatic pressure on the orifice 17.

The conditioning chamber 13 is defined by the pot structure 18 including a metallic liner 19 and refractory 20. The pot structure is heated by the heating coil 21 which is automatically controlled by the heat sensing element 22 electrically connected to the power control unit 23. The power control unit 23 connects the coil 21 to an external source of alternating current. Additional control unit 25 electrically connects the source of electrical energy to the coil 21 on the orifice 17. The overall furnace arrangement includes a series of automatically controlled heating elements to provide an accurate temperature control. The temperature control determines the viscosity of the molten glass in the particular area of the furnace which it regulates. The static pressure at the orifice combined with the viscosity also determines the rate of flow through the orifice. With a predetermined rate of flow the area of the orifice can be readily determined to provide the proper rate of discharge of the quality glass from the orifice 17 in the conditioning chamber 16.

The device operates in the following manner. A melting chamber 1 is adapted to operate in conjunction with a uniform rate of feed from a supply chamber containing glass forming material constituents. The feed of the material is distributed in the melting chamber to rapidly and evenly melt in the upper portion of the chamber. The melting chamber is maintained at a substantially constant temperature. For the purpose of illustration only, this temperature will be considered to be approximately 2600° F. Melting temperatures vary with glass compositions. The melted glass is immediately melted and degassed and partially homogenized in the melting chamber. A circulation is created in the melting pot by the convection currents due to the peripheral heating in the melting chamber by the coil 5. The heating element 9 is also temperature regulated to provide the proper temperature in the orifice 8 to maintain the predetermined rate of flow through the orifice. At a temperature of approximately 2600° the fluid in the melting chamber 1 has liquid characteristics and flows quite readily through the orifice 8 which is of a small cross section to compensate for the low viscosity of the melted glass in this area.

The melt enters the conduit 12 which is also temperature controlled in response to the heat sensing element 15 and the control unit 14. The glass however in being transferred of the melting chamber 1 to the conditioning chamber 13 is cooled in the conduit 12. The cooling effect is caused by exposure to the atmosphere plus heat loss through the conduit insulation which cools the glass approximately 300° in the transferring process. The glass fed into the conditioning chamber 13 for the purpose of illustration only is considered to be 2300° F.

The conditioning chamber is maintained at approximately 2300° by the power control unit in response to the heat sensing element 22. The glass in the conditioning chamber is more viscous and suitable for conditioning. The glass discharged through the orifice 17 is also temperature controlled by the heating element 30 which is the power control unit 25. The orifice 17 is substantially larger due to the more viscous state of the molten glass 16 in the melting chamber 13.

The melting chamber 1 is maintained at a high temperature to provide a rapid melt and release of gas from the fluid as well as homogenization. The complete isolation thermally and hydraulically of the conditioning chamber 13 from the melting chamber 1 permits the cooling of the glass to an ideal conditioning temperature. It also prohibits any of the hotter, less viscous glass from finding its way to the orifice 17 and varying the established flow rate. The head in the conditioning chamber 13 is accurately maintained through the rate of flow through the orifice 8. The constant head maintains the hydrostatic pressure on the orifice 17. The thermal control of the heating elements maintains the viscosity at a constant value and therefor is a factor of the rate of flow through the orifice 17. The rate of flow controls the weight of the gobs of glass which may be sheared upon discharge from orifice 17. The glass melted and conditioned in the illustrated furnace are intended to be of optical quality whereby ophthalmic lenses may be manufactured. Accordingly it is necessary that the excess glass on each lens blank be kept at a minimum. Such an arrangement for the flow control as illustrated provides a very accurate supply system for production of lens blanks where each lens blank is substantially equal in weight to the preceding blank.

It is apparent various modifications of this invention might be made within the spirit of the invention. The present disclosure is merely illustrative and not limitive. The attached claims cover the scope of the invention.

We claim:

1. In a glass furnace a flow control arrangement comprising, means defining a melting chamber and discharge orifice having temperature controlled heating means controlling the temperature of the molten glass contained therein, means defining a conditioning chamber and discharge orifice positioned below said melting chamber thermally and hydraulically isolated from said melting chamber having temperature controlled heating means controlling the temperature of molten glass contained therein for controlling the rate of discharge from said conditioning chamber, transfer means separately positioned between said melting chamber and said conditioning chamber transferring molten glass from said melting chamber to said conditioning chamber and having temperature regulating means changing the temperature of molten glass in transferring from said melting chamber to said conditioning chamber preventing premature discharge of less viscous glass flowing through said conditioning chamber orifice and controlling the rate of flow from the discharge orifice of said conditioning chamber.

2. In a glass furnace the combination of the flow control arrangement comprising, means defining a melting chamber adapted for receiving glass forming constituents from a feeding device, a discharge orifice associated with said melting chamber, temperature controlled heating means controlling the temperature of the molten glass in said melting chamber and said discharge orifice, means defining a glass conditioning chamber and discharge orifice positioned below and in spaced relation to said melting chamber and thermally and hydraulically isolated from said melting chamber, heating means associated with said conditioning chamber and discharge orifice maintaining a constant temperature and viscosity of the molten glass in said conditioning chamber, conduit means positioned between said melting chamber and said conditioning chamber receiving molten glass from the discharge orifice of said melting chamber and delivering molten glass to said conditioning chamber and having temperature regulating means cooling the molten glass in transferring from said melting chamber to said conditioning chamber thereby regulating the static pressure on the discharge orifice of said conditioning chamber and the rate of flow from said orifice.

3. A continuous flow glass furnace having a flow control means including, means defining a melting chamber having a discharge orifice adapted to receive raw batch constituents, temperature regulated heating means positioned adjacent said melting chamber and said orifice controlling the temperature and melting rate of molten glass in said melting chamber and the viscosity and rate of discharge through said orifice, means defining a conditioning chamber having a discharge orifice in spaced relation to said melting chamber providing thermal and hydraulic isolation from said melting chamber for receiving molten glass from the discharge orifice of said melting chamber, temperature controlled heating means positioned adjacent to said melting chamber and said discharge orifice controlling temperature and viscosity of the molten glass in said conditioning chamber and thereby controlling the rate of discharge from said orifice.

4. A continuous flow glass furnace having a flow control means including, means defining a melting chamber adapted to receive a metered rate of feed of raw batch constituents, heating means positioned around said melting chamber controlling the temperature and melting rate of raw batch constituents in said melting chamber, means defining a discharge orifice in communication with said melting chamber, heating means located around said discharge orifice controlling the viscosity and static pressure in said orifice and the rate of flow through said orifice, a temperature regulated transfer means separately positioned under the orifice receiving molten glass from said discharge orifice controlling the temperature change of molten glass while in said transfer means, means defining a conditioning chamber separately positioned under and receiving molten glass from said transfer means for providing a conditioning chamber thermally and hydraulically isolated from said melting chamber, heating means connected to said conditioning chamber controlling the temperature and viscosity in said conditioning chamber, a temperature controlled orifice communicating with said conditioning chamber controlling the viscosity and rate of discharge and thereby the static pressure on said orifice to control the rate of flow of glass through said orifice.

5. A continuous flow glass furnace having a flow control means including, means defining a melting chamber adapted to receive a metered rate of feed of raw batch constituents, means defining a discharge orifice in communication with said melting chamber, heating means connected to said melting chamber for maintaining a predetermined constant temperature and controlling the rate of melting of raw batch constituents in said melting chamber in accordance with the rate of feed, heating means associated with said discharge orifice controlling the viscosity and static pressure on said orifice to control the rate of flow through said orifice, temperature regulated transfer means in spaced relation to said orifice receiving molten glass from said discharge orifice and having means controlling a predetermined degree of cooling of molten glass while in said transfer means, means defining a conditioning chamber in spaced relation to said transfer means thermally and hydraulically isolated from said melting chamber receiving molten glass from said transfer means, means defining a discharge orifice in communication with said conditioning chamber for discharge of molten glass from said conditioning chamber, heating means connected to said conditioning chamber for maintaining a constant conditioning temperature and controlling the viscosity of molten glass in said conditioning chamber, heating means connected to said conditioning chamber discharge orifice controlling the viscosity, the static pressure and the rate of discharge of molten glass through said orifice and thereby controlling the flow of glass from said conditioning chamber.

References Cited by the Examiner

UNITED STATES PATENTS

| | | | |
|---|---|---|---|
| 2,465,283 | 3/1949 | Schlehr | 65—335 X |
| 2,495,956 | 1/1950 | Cook | 65—162 X |
| 2,539,145 | 1/1951 | Light | 65—162 X |
| 2,926,208 | 2/1960 | Eden | 65—347 X |

DONALL H. SYLVESTER, *Primary Examiner.*